US009407981B2

(12) United States Patent
Rich et al.

(10) Patent No.: US 9,407,981 B2
(45) Date of Patent: Aug. 2, 2016

(54) AUDIO CLASS-COMPLIANT CHARGING ACCESSORIES FOR WIRELESS HEADPHONES AND HEADSETS

(71) Applicant: Apple Inc., Cupertino, CA (US)

(72) Inventors: Zachary C. Rich, San Francisco, CA (US); Baptiste P. Paquier, Saratoga, CA (US); Joseph A. Sarlo, Sunnyvale, CA (US); Jahan C. Minoo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/517,693

(22) Filed: Oct. 17, 2014

(65) Prior Publication Data

US 2016/0112787 A1     Apr. 21, 2016

(51) Int. Cl.
*H04R 25/00* (2006.01)
*H04R 1/10* (2006.01)
*H04B 1/3827* (2015.01)

(52) U.S. Cl.
CPC .............. *H04R 1/10* (2013.01); *H04B 1/385* (2013.01); *H04B 2001/3872* (2013.01); *H04R 25/43* (2013.01); *H04R 25/50* (2013.01); *H04R 25/55* (2013.01)

(58) Field of Classification Search
USPC ...................... 381/80, 81, 314, 315
See application file for complete search history.

(56) References Cited

U.S. PATENT DOCUMENTS

| 8,767,996 B1 | 7/2014 | Yamasaki et al. |
| 2007/0054705 A1* | 3/2007 | Liow ............... H04M 1/6066 455/572 |
| 2008/0032663 A1* | 2/2008 | Doyle ............... H04H 20/106 455/345 |
| 2012/0106753 A1 | 5/2012 | Theverapperuma et al. |
| 2013/0289986 A1 | 10/2013 | Graylin et al. |
| 2014/0079236 A1 | 3/2014 | Yamkovoy et al. |

OTHER PUBLICATIONS

International Patent Application No. PCT/US2015/055123 "International Search Report and Written Opinion", Jan. 20, 2016, 11 pages.

* cited by examiner

*Primary Examiner* — Amir Etesam
(74) *Attorney, Agent, or Firm* — Kilpatrick Townsend & Stockton LLP

(57) ABSTRACT

A headphone is disclosed herein. The headphone includes a wireless transceiver, a wired communication module, a power storage device, a speaker, and control circuitry. The wireless transceiver and the wired communication module and the wireless transceiver are connected to the speaker via the control circuitry. The control circuitry is configured to determine whether to control the speaker according to data received via the wired communication module and the wireless transceiver and to seamlessly transition control of the speaker from data received from one of the wired communication module and the wireless transceiver to the other of the wired communication module and the wireless transceiver.

20 Claims, 4 Drawing Sheets

AUDIO CLASS-COMPLIANT CHARGING ACCESSORIES FOR WIRELESS HEADPHONES AND HEADSETS

BACKGROUND

Electronic media consumption appears to be increasing both in volume and in the number of locations of consumption. This is particularly the case with the increase in prevalence of portable electronic devices, such as handheld electronic devices. Frequently, individuals consume this media using headphones, which can include a speaker that is positioned proximate to the ear. While headphones increase the ease with which media can be consumed, by increasing both the privacy with which the media can be consumed, and in many cases, the quality of audio, headphones are not desirable in every circumstance, and issues can arise in the use of headphones. Accordingly, new devices, systems, and methods are required to improve the performance of headphones.

BRIEF SUMMARY

Some embodiments relate to a headphone. The headphone includes an energy storage device, a wireless transceiver, which can include a wireless receiver, and a connector having a first contact and a second contact. In some embodiments, the first contact is connected to the energy storage device such that the energy storage device can be charged via the first contact. In some embodiments, the first contact can comprise a plurality of contacts including, for example, a power contact and a ground contact. The headphone can include an earpiece having a speaker, which speaker can be controllably connected to the second contact and to the wireless transceiver. In some embodiments, the second contact can comprise one or several contacts configured to transmit control signals. In one embodiment, the second contact can comprise a pair of contacts positioned so as to connect to components configured to transmit via a differential signal.

In some embodiments, the headphone includes a data buffer operatively coupled to receive audio data from the wireless transceiver and the second contact and to output audio data to the speaker. In some embodiments, the headphone includes control circuitry coupled to the data buffer and the speaker, the control circuitry can: (i) provide a first path for audio data received over the wireless transceiver to be stored in the data buffer and a second path for audio data received over the second contact to be stored in the data buffer, and (ii) determine whether to control the speaker according to audio data received over the wireless transceiver or according to audio data received of the second contact and/or whether to store audio data in the buffer that is received from the wireless transceiver or from the second contact.

In some embodiments, the control circuitry of the headphone can include a processor. In some embodiments, the processor can seamlessly transition speaker control between data received via the wireless transceiver and data received via the second contact. In some embodiments, the data buffer can be sized to operate the headphone for a predetermined amount of time without the receipt of additional data via the wireless transceiver or the second contact. This length of time can be greater than the length of time required to transition between storing data from the wireless transceiver into the buffer to storing data from the connector into the buffer.

In some embodiments, the headphone can be capable of receiving digital audio data via the second contact, and in some embodiments, the headphone can be capable of receiving analog data via the second contact. In some embodiments, the connector can be a USB connector, and in some embodiments, the connector can be a custom connector with USB signaling. In some embodiments, the energy storage device can be a rechargeable battery.

Some embodiments relate to a method of seamlessly transitioning between data sources controlling operation of a speaker. The method includes receiving data at a headphone from a user device via first data path, storing data received at the headphone from the user device via the first data path within a data buffer, controlling a speaker according to the data stored within the data buffer, receiving data from a second data path, and transitioning from storing data from the first data path within the data buffer to storing data from the second data path within the data duffer without affecting the controlling of the speaker according to the data stored within the data buffer.

In some embodiments, the first data path can be a wireless connection with a user device. In some embodiments, the second data path can be a wired connection with a user device.

In some embodiments, the method can include determining that the user device connected via the wired connection is the same user device as is connected via the wireless connection. An exemplary embodiment of the method can include determining that the data received via the second data path is the same as the data received via the first data path. In some embodiments, the method can include stopping the storing of data received from the first data path within the data buffer, and/or identifying a stopping point in the data stored in the data buffer and received from the first data path. In some embodiments, the stopping point can be the last data received from the first data path and stored in the data buffer.

In some embodiments, the method can include identifying data corresponding to the stopping point in the data received from the second data path. An exemplary embodiment of the method can include storing data from the second data path after the data corresponding to the stopping point in the data buffer. In some embodiments, the method can include sizing the data buffer to allow transitioning from storing data from the first data path within the data buffer to storing data from the second data path within the data buffer without affecting the controlling of the speaker according to the data stored within the data buffer.

DETAILED DESCRIPTION

Embodiments of the headphone are disclosed herein. The headphone can include features to allow and facilitate the wireless and wired reception of data, including audio data, that can be used to control operation of one or more speakers of the headphone. In one embodiment, the headphone can include control circuitry connected to at least one speaker. The control circuitry can receive audio data from a wireless transceiver of the headphone and/or from a connector of the headphone, which wireless receiver can be a receiver. The control circuitry can, if audio data is received from both the wireless transceiver and the connector of the headphone, determine which audio data to use in controlling the speaker and can, determine whether to switch from controlling the speaker according to audio data from one of the wireless transceiver and the connector to controlling the speaker according to audio data from the other of the wireless transceiver and the connector. If it is determined that the control of the speaker should switch from audio data received from one of the wireless transceiver and the connector to audio data received from the other of the wireless transceiver and the connector, the control circuitry can seamlessly transition control of the speaker so that the transition is not noticed by the user. This can allow a user to switch between wired and wireless use of the headphone, which can improve the user experience.

In some embodiments of the headphone, the connector of the headphone can connect with the cable that can connect to or be connected to the user device. The connector of the headphone can include one or several first contacts and one or several second contacts, which first contacts can receive power from the cable and which second contacts can receive the audio data from the cable. In some embodiments, the first contacts can comprise a pair of contacts, one of which can be connected to circuitry to provide power—a power contact, and the other of which connected to ground—a ground contact. In some embodiments, the second contacts can comprise a pair of contacts connected to circuitry configured to transmit and/or receive data via differential signaling. In some embodiments, the cable can provide both power and audio data to the headphone. This combination of power and data into a single cable connected to the headphone can improve headphone performance by eliminating ground loops that can arise if separate power and data cables are connected to the headphone, which ground loops can degrade performance of the headphone, and specifically can adversely impact the audio fidelity of the headphone. Additionally, this combination of power and data into a single cable connected to the headphone can improve the user experience by eliminating the need for use of a cable to power the headphone and a separate cable to control the headphone.

Figure 1:
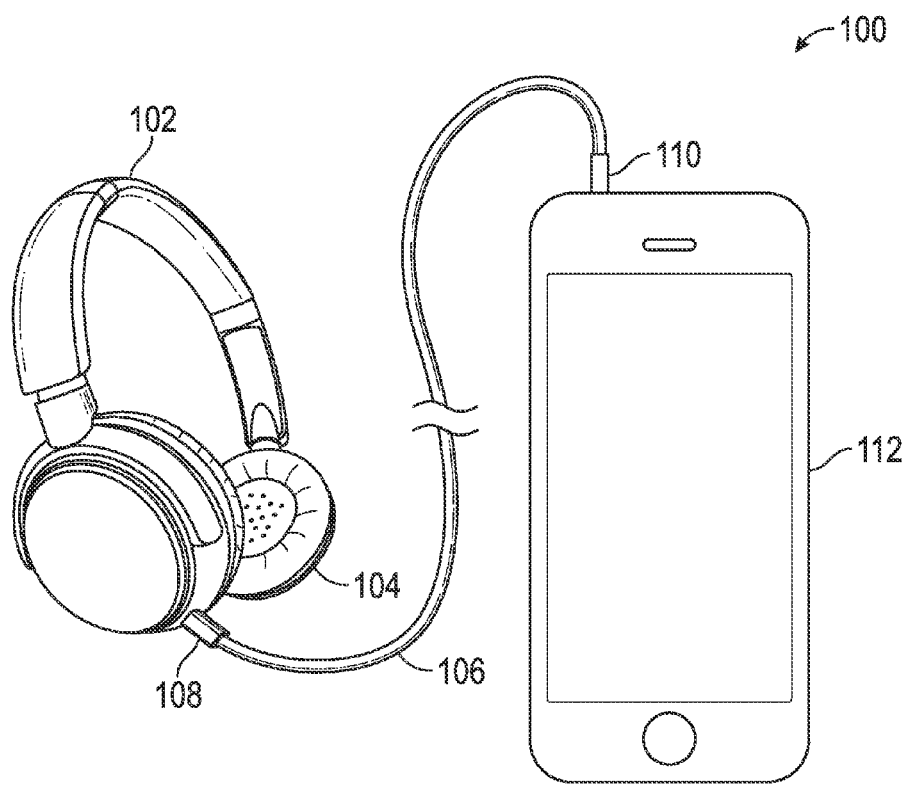
FIG. 1 is a schematic illustration of one embodiment of a headphone system communicating via a wired connection.

With reference now to FIG. 1, a schematic illustration of one embodiment of a headphone system 100 is shown, and specifically, one embodiment of headphone system 100 configured for wired communication of audio data is shown. Headphone system 100 includes a headphone 102. Headphone 102 can be configured to receive audio data and convert the audio data into sound. Headphone 102 can be a variety of shapes and sizes, can be made from a variety materials, and can include a variety of features. In some embodiments, headphone 102 can include, for example, a head-fitting headphone, an ear-fitting headphone, such as, for example, ear buds, or any other type of headphone.

In the embodiment depicted in FIG. 1, headphone 102 includes earpieces 104. Earpieces 104 can interface between the user's ear and headphone 102. In some embodiments, earpieces 104 can include one or several features configured to generate sound such as, for example, one or several speakers.

Headphone system 100 can include a cable 106 that can, for example, include features to allow simultaneous providing of power, such as electricity, and audio data to headphone 102. Cable 106 can be a variety of shapes and sizes, a variety of cable types, and can be made from a variety of materials.

Cable 106 can connect to headphone 102 via a headphone connector 108. Headphone connector 108 can be a variety of shapes and sizes and can be a variety of different connector types. In some embodiments, headphone connector 108 can receive power and/or audio data that can be used to control sound generated by headphone 102. In some embodiments, headphone connector 108 can include features for receiving power to charge headphone 102 and features for receiving audio data to control sound generated by headphone 102. In some embodiments, headphone connector 108 can be, for example, a USB connector, a SATA connector, or any other desired connector.

In some embodiments, headphone connector 108 can include a first portion that is located on headphone 102 such as, for example, a connector receptacle or a connector insert and a mating second portion that is located on cable 106. Details of connector 108 will be discussed at greater length below.

Headphone system 100 can include user device 112. User device 112 can be the source of audio data that controls the operation of headphone 102 and/or the source of power for the headphone 102. In some embodiments, user device 112 can be an electronic device such as a portable electronic device including, for example, a computer, a tablet, a cell phone, a smart phone, a PDA, a television, a radio, a gaming console, or any other electronic device usable to consume media.

In some embodiments, user device 112 can connect to cable 106 via a device connector 110. Device connector 110 can be a variety of shapes and sizes and can be a variety of different connector types. In some embodiments, device connector 110 can transmit power and/or audio data that can be used to control sound generated by headphone 102. In some embodiments, device connector 110 can include features for transmitting power to power headphone 102 and/or for transmitting audio data to control sound generated by headphone 102. In some embodiments, device connector 110 can be, for example, a USB connector, a SATA connector, or any other desired connector. In some embodiments, device connector 110 can include a first portion that is located on user device 112 such as, for example, a connector receptacle or a connector insert and a mating second portion that is located on cable 106

Figure 2:
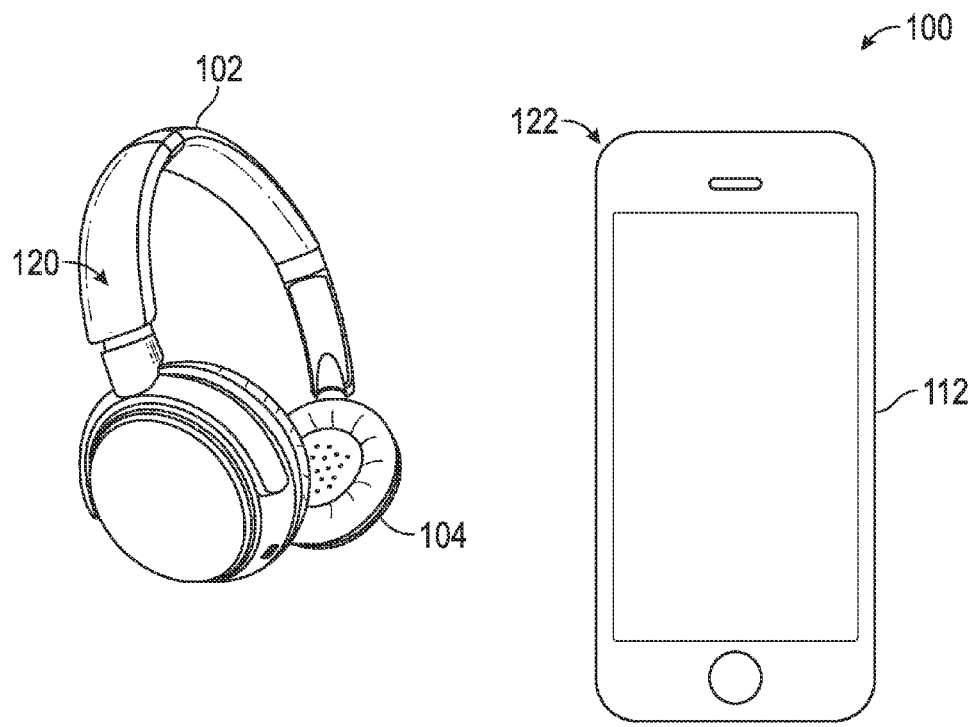
FIG. 2 is a schematic illustration of one embodiment of a headphone system communicating via a wireless connection.

With reference now to FIG. 2, a schematic illustration of one embodiment of a headphone system 100 is shown, and specifically, one embodiment of a headphone system 100 configured for wireless communication of audio data is shown. Headphone system 100 includes a headphone 102 having earpieces 104. Headphone 102 additionally includes an antenna 120. Antenna 120 can be part of a wireless transceiver that will be discussed at greater length below. In some embodiments, antenna 120 can be located so that all or portions of antenna 120 are inside of headphone 102, and in some embodiments, antenna 120 can be located so that all or portions of antenna 120 are external to headphone 102. Antenna 120 can be configured to receive information, such as, for example, audio data, from user device 112 from user device 112.

As further seen in FIG. 2, headphone system 100 includes user device 112 that include a wireless transmitter 122. Wireless transmitter can include an antenna, and in some embodiments, wireless transmitter 122 can be located so that all or portions of wireless transmitter 122 are inside of user device 112, and in some embodiments, wireless transmitter 122 can be located so that all or portions of wireless transmitter 122 are external to user device 112. Wireless transmitter 122 can be configured to transmit information, such as, for example, audio data, to headphone 102. In some embodiments, the wireless communication between headphone 102 and user device 112 can be performed according to any desired communication protocol or standard including, for example, Bluetooth, WiFi (WLAN), NFC, or the like With reference now to FIG. 3, a perspective view of one embodiment of a headphone 102 is shown. Headphone 102 can be configured to receive data, including, for example, audio data, and convert the data into sound. Headphone 102 can be a variety of shapes and sizes, can be made from a variety materials, and can include a variety of features. In some embodiments, headphone 102 can include, for example, a head-fitting headphone, an ear-fitting headphone—such as ear buds, or any other type of headphone.

Headphone 102 includes a headband 202. Headband 202 can be sized and shaped to fit to a user's head, and can, in some embodiments, be adapted for variable sizing to fit to a variety of user heads. Headband 202 attaches to earpieces 104 of headphone 102 and holds earpieces 104 proximate to the user's ear when headphone 102 is placed on users head.

Figure 3:
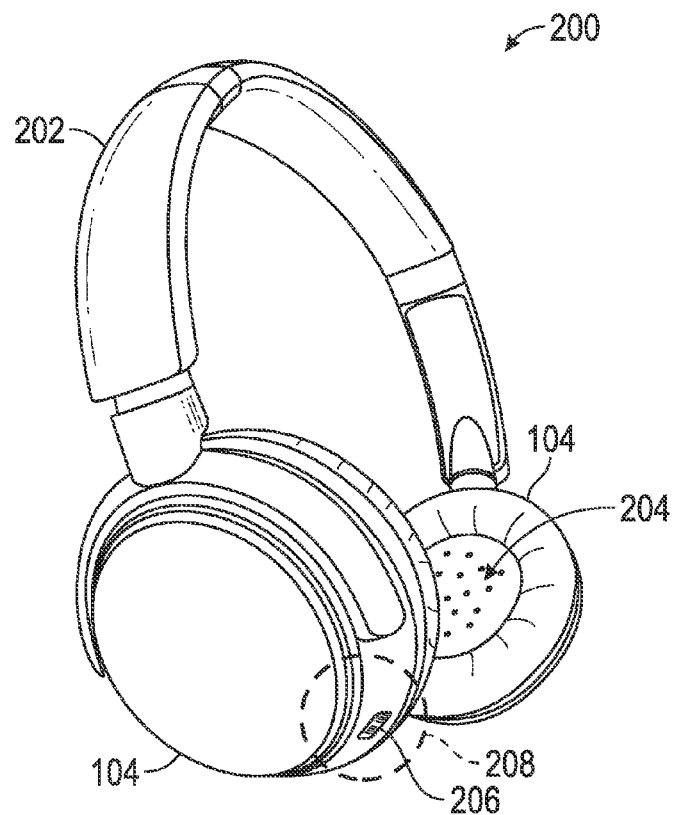
FIG. 3 is a perspective view of one embodiment of a head-fitting headphone.

As seen in FIG. 3, earpieces 104 include a speaker 204. Speaker 204 can be used to generate sound based on audio data received by headphone 102. Speaker 204 can be any desired type of controllable sound generating device.

Headphone 102 includes a connector 206. Connector 206 depicted in FIG. 3 is located on headband 202, but in other embodiments, connector 206 can be located on other portions of headphone 102 including, for example, on earpiece 104.

Connector 206 can receive audio data for controlling operation of speaker 204 and can receive power including, for example, an electric power, for charging/recharging headphone 102 and/or for powering headphone 102. Connector 206 can be a variety of shapes and sizes and can be a variety of types. In some embodiments, the size, shape, and type of connector 206 can be selected based on desired traits of headphone 102 such as, for example, the size and compatibility of headphone 102. In some embodiments, connector 206 can include, for example, a universal serial bus ("USB") connector, a SATA connector, or any other connector type. Connector 206 can further be either a male or female connector, and can include, for example, a connector receptacle or a connector insert.

Figure 4:
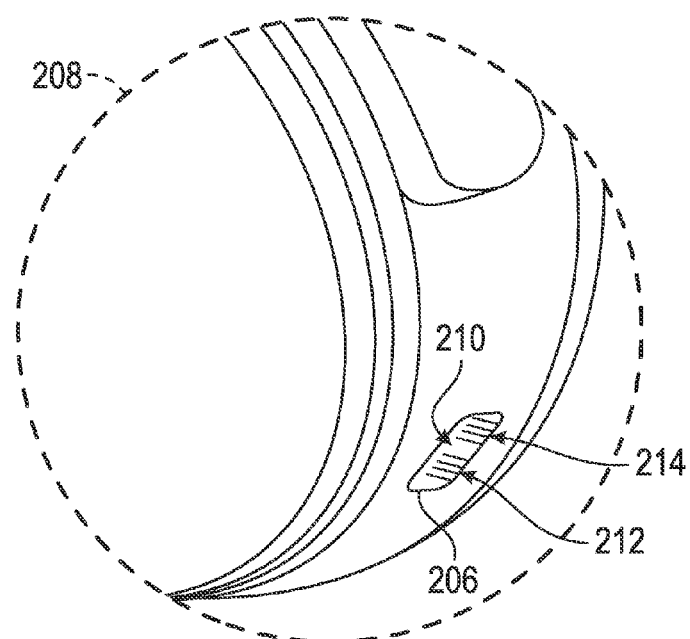
FIG. 4 is a detail view of a portion of the headphone of FIG. 3.

FIG. 3 further depicts detail region 208 which is shown enlarged in FIG. 4. As seen in the expanded detail region 208 of FIG. 4, connector 206 includes a plurality of contacts 210. Contacts 210 can interface with corresponding contacts of cable 106 to allow the communication of data, which can include audio data, between user device 112 and headphone 102, and/or transmission of power, such as electric power between user device 112 and headphone 102.

Contacts 210 can include at least one first contact 212 and at least one second contact 214. In some embodiments, first contact 212 can be connected with power-consuming and/or power-storing components of headphone 102. In such an embodiment, power can be received from cable 106 via first contact 212 and provided to the power-consuming and/or power-storing components of headphone 102. In some embodiments, second contact 214 can be connected with control circuitry of headphone 102. In such an embodiment, data, including audio data and particularly digital audio data, received via second contact 214 can be provided to control circuitry of headphone 102, and can be used to control operation of speaker 204 of headphone 102.

Figure 5:
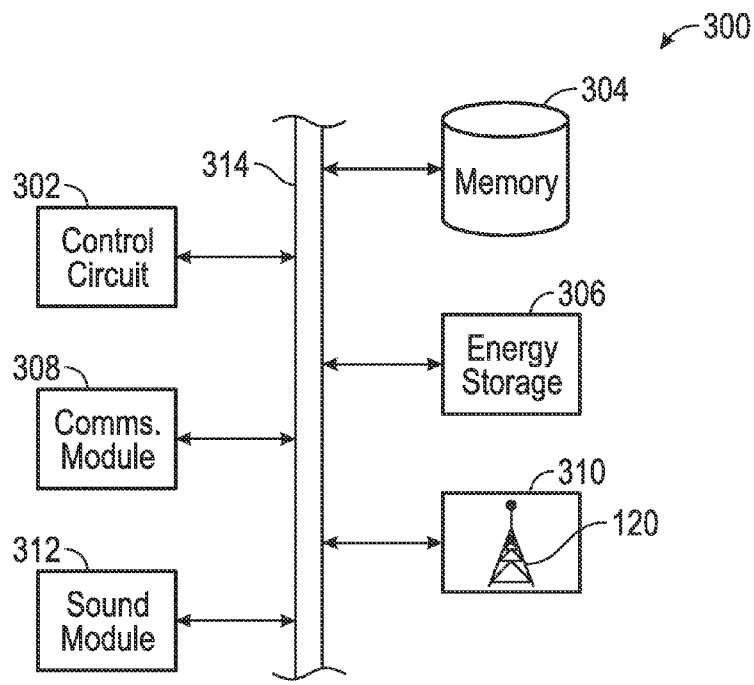
FIG. 5 is a schematic illustration of one embodiment of a headphone.

With reference now to FIG. 5, a schematic illustration of one embodiment of the hardware and software components 300 and/or modules of headphone 102 is shown. Headphone 102 can optionally include a control circuitry 302 that can include, for example, a processor. The processor can provide instructions to and receive information from the other components of headphone 102. The processor can act according to stored instructions, which stored instructions can be located in memory, associated with the processor, and/or in other components of the headphone 102. The processor can make decisions in accordance with stored instructions. The processor can be a microprocessor, such as a microprocessor from Intel® or Advanced Micro Devices, Inc.®, or the like. In some embodiments, the processor can be a System on Chip (SOC) such as, for example, an integrated circuit manufactured with ARM System-on-Chip architecture.

In some embodiments, the stored instructions directing the operation of the processor may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Headphone 102 can optionally include a memory 304. Memory 304 may represent one or more memories for storing data, including read only memory (ROM), random access memory (RAM), magnetic RAM, core memory, optical storage mediums, flash memory devices and/or other machine readable mediums for storing information. In some embodiments, memory 304 may be implemented within the processor or external to the processor. In some embodiments, memory 304 can be any type of long term, short term, volatile, nonvolatile, or other storage medium and is not to be limited to any particular type of memory or number of memories, or type of media upon which memory is stored. In some embodiments, memory 304 can include, for example, one or both of volatile and nonvolatile memory. In one specific embodiment, memory 304 can include a volatile portion such as RAM memory, and a nonvolatile portion such as flash memory Headphone 102 can include a buffer, also referred to herein as a data buffer. The buffer can be configured to temporarily store data that is being received by headphone 102. In some embodiments, the buffer can be implemented in the memory 304, can be implemented in software stored in the memory, or can be implemented in the control circuitry 302. In some embodiments, the buffer can receive data, including audio data and specifically including digital audio data from wired communication module 308, and specifically from second contact 214, and/or wireless transceiver 310, and can provide this data to control circuitry 302 of headphone 102.

As depicted in FIG. 5, headphone 102 can optionally include an energy storage device 306. Energy storage device 306 can store energy such as, for example, electrical energy that can power headphone 102. Energy storage device 306 can be any feature or combination of features capable of storing a desired amount of energy. In some embodiments, energy storage device 306 can be one or several batteries, rechargeable batteries, capacitors, or the like. Energy storage device 306 can have any desired capacity. In some embodiments, energy storage device 306 can have a capacity so as to enable operation of headphone 102 on power from energy storage device 306 for duration of at least 1 hour, 2 hours, 3 hours, 4 hours, 5 hours, 10 hours, 20 hours, 50 hours, or any other or intermediate length of time.

Headphone 102 can optionally include a wired communication module 308. In some embodiments, the wired communication module can include connector 206, contacts 210, and/or any other hardware or software component used in receiving power and/or data, including audio data, via connector 206.

Headphone 102 can optionally include a wireless transceiver 310, which can be, for example, a wireless receiver. Wireless transceiver 310 can, in some embodiments, include antenna 120 and software or hardware components used to control and/or operate antenna 120. Wireless transceiver 310 can be configured to wirelessly send and receive information. In some embodiments, for example, wireless transceiver 310 can receive data, which can include, for example, audio data from the user device 112 and provide this data to other components of headphone 102 including, for example, control circuitry 302.

Headphone 102 can optionally include a sound generation module 312. In some embodiments, sound generation module 312 can include speaker 204 or other components of headphone 102 that create sound waves and/or control speaker 204 or the creation of sound waves.

In some embodiments, components 300 of headphone 102 can be communicatingly and/or electrically connected. As depicted in FIG. 5, components 300 of headphone 102 are communicatingly and/or electrically connected via a circuit board 314. While depicted in the embodiment of FIG. 5 as circuit board 314, components 300 of headphone 102 can be connected via any desired features or components including, for example, one or several wires, one or several light-guides, or the like.

Figure 6:
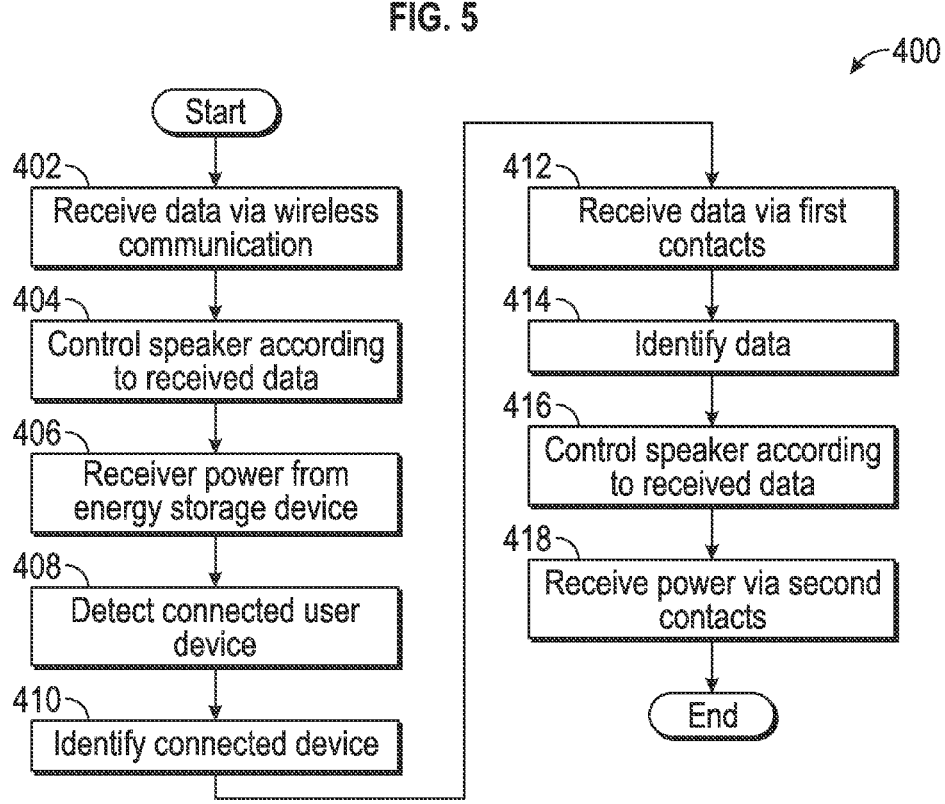
FIG. 6 is a flowchart illustrating one embodiment of a process for controlling a headphone to generate sound.

With reference now to FIG. 6, a flowchart illustrating one embodiment of a process 400 for generating sound with headphone 102 is shown. Process 400 begins at block 402 wherein data is wirelessly received via wireless transceiver 310. In some embodiments, this data can be received from a user device 112, which user device 112 can be identified based, in part, on the received data. This data, which can include audio data, is provided to control circuitry 302. The control circuitry 302 can, as illustrated in block 404 control the sound generation module 312 and the speaker 204 according to the data.

After the sound generation module 312 is controlled according to the received data, or simultaneously therewith, process 400 proceeds to block 406, wherein power is received from energy storage device 306. In some embodiments, this can include using power from energy storage device 306 to power the operation of headphone 102.

In some embodiments, while headphone 102 is operating according to data received via wireless transceiver 310, a connection to a user device 112 via wired communication module 308 is detected as indicated in block 408. In some embodiments, this detection can include, for example, identifying the user device 112 connected via wired communication module 308 and determining if the user device 112 connected via wired communication module 308 is the same as the user device 112 connected via wireless transceiver 310.

After the user device 112 connected via wired communication module 308 has been identified, process 400 proceeds to block 412, wherein data, including, for example, audio data, is received via contacts 210, and in some embodiments, via second contacts 214. After the data has been received, process 400 proceeds to block 414, wherein the received data is identified. In some embodiments, the identification of the received data can include determining if the data received via wired communication module 308 is the same as data received via wireless transceiver 310.

After the data received via wired communication module 308 has been identified, process 400 proceeds to block 416, wherein speaker 204 is controlled according to the received data. In some embodiments, speaker 204 can be controlled according to the received data by control circuitry 302, which control circuitry 302 can generate control signals, corresponding to the received data, to control speaker 204. In some embodiments in which it is determined that the user device 112 connected to headphone 102 via wired communication module 308 is the same as the user device 112 connected to headphone 102 via wireless transceiver 310, and/or it is determined that the data received via wireless transceiver 310 is the same as data received via wired communication module 308, this step can include controlling speaker 204 according to the data received via wired communication module 308. In some embodiments in which it is determined that the user device 112 connected to headphone 102 via wired communication module 308 is different than the user device 112 connected to headphone 102 via wireless transceiver 310, and/or it is determined that the data received via wireless transceiver 310 is different than data received via wired communication module 308, this step can include controlling speaker 204 according to the data received via wireless transceiver 310.

After the speaker is controlled according to the received data, or simultaneous therewith, process 400 proceeds to block 418, wherein power is received via wired communication module 308. In some embodiments, this can include receiving electrical power via connector 206 and/or at least one contact 210 of connector 206, including, for example, first contact 212.

Figure 7:
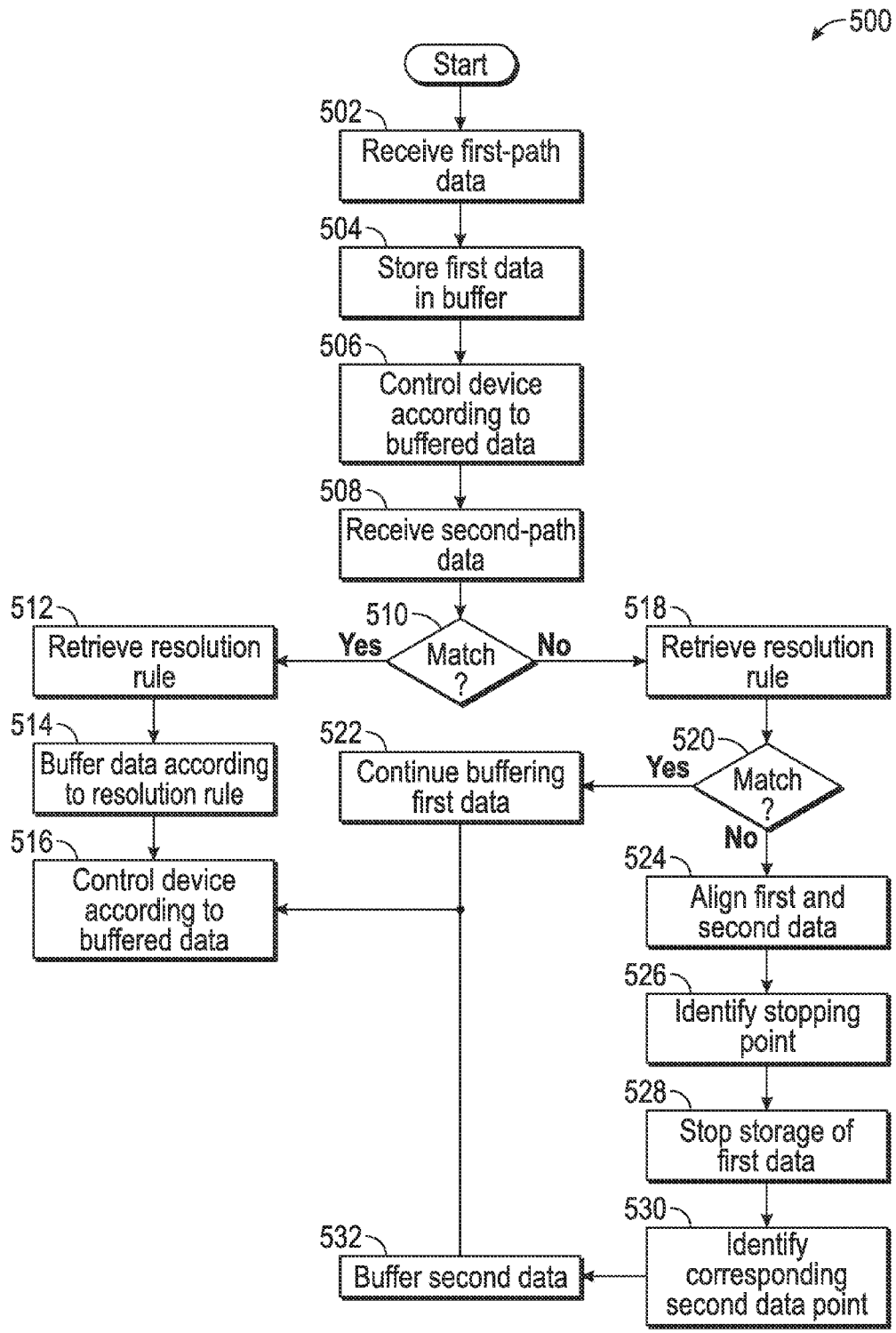
FIG. 7 is a flowchart illustrating one embodiment of a process for controlling a headphone to seamlessly transition between data sources.

With reference now to FIG. 7, a flowchart illustrating one embodiment of a process 500 for controlling headphone 102 is shown. Process 500 can be performed to allow seamless transition between controlling headphone 102 according to data received via wired communication module 308 and data received via wireless transceiver 310. In some embodiments, the steps of process 500 can be serially performed, one after another, and in some embodiments, one or several of the steps of process 500 can be simultaneously performed.

Process 500 begins in block 502 wherein data is received via a first path. Data received via a first path is also referred to herein as first data. In some embodiments, data received via the first path can be received via one of the wired communication module 308 and wireless transceiver 310. In some embodiments, this first data can be received from a user device, which user device can, in some embodiments, be identified based on some or all of the first data.

After the data has been received via the first path, or alternatively if data is received via the first path over a period of time such as, for example, when data is being streamingly received, while the data is being received via the first path, process 500 proceeds to block 504 wherein some or all of the first data is stored in the buffer and/or is buffered. In some embodiments, the buffer can be in memory 304. In some embodiments, the amount of data stored in the buffer and/or buffered can be selected to allow a desired amount of uninterrupted sound generation by speaker 204 if the receipt of data by headphone 102 is interrupted. In some embodiments, the buffer can be sized to allow uninterrupted sound generation for 0.1 seconds, 0.2 seconds, 0.3 seconds, 0.5 seconds, 1 second, 2 seconds, 3 seconds, 5 seconds, 10 seconds, 20 seconds, 30 seconds, 1 minute 5 minutes, and/or any other or intermediate length of time.

After or while the first data has been stored in the buffer, and after and/or while data is being buffered, process 500 proceeds to block 506, wherein headphone 102, and specifically speaker 204 of headphone 102 is controlled according to the first data that is stored in the buffer. In some embodiments, control circuitry 302 can receive data from the buffer and can, based on the received data, generate control signals to control the operation of speaker 204.

After, or simultaneous with the control of headphone 102 according to the first data, process 500 proceeds to block 508, wherein data is received via a second path. The data received via the second path is also referred to herein as second data. In some embodiments, data received via the second path can be received via the other of the wired communication module 308 and wireless transceiver 310 than by which the first data was received. In some embodiments, this second data can be received from a user device, which user device may be the same or different than the user device from which the first data was received. In some embodiments, this user device can be identified based on some or all of the second data.

After, or simultaneous with the receipt of the second data, process 500 proceeds to decision state 510, wherein it is determined if there is a match. In some embodiments, this determination can include determining whether the user-device source of the first and second data is the same and/or whether the first and second data are the same. These determinations can be made by, for example, comparing information identifying the user-device source of both the first and second data to see if the user devices are the same, and/or comparing the first and second data to determine if there is a match between some or all of the received first and second data. In some embodiments a match may be identified if some or all of the received first and second data match, even in instances having an offset in time between receipt of the first and second data. In some embodiments, a match may be identified if there is an acceptable level of difference between the first and second data. In some embodiments, for example, a discrepancy between the first and data may arise due to an error or aberration. In embodiments in which a match can be identified if there is an acceptable level of difference between the first and second data, the discrepancy between the first and second data can be identified, quantified, and compared to a threshold value to determine if there is an acceptable level of difference between the first and second data. In some embodiments, the comparison of the first and second data can be performed by control circuitry 302.

If it is determined that there is not a match, then process 500 proceeds to block 512 wherein a resolution rule is retrieved. In some embodiments, the resolution rule can include one or several rules for selecting one of the first and second data for control of headphone 102. In some embodiments, the resolution rule can, for example, indicate that headphone 102 is controlled according to data received via one of wired communication module 308 and wireless transceiver 310 when data is received via both of wired communication module 308 and wireless transceiver 310. In one embodiment, for example, the resolution rule can indicate that headphone 102 is controlled according to data received via wired communication module 308 when data is received via both of wired communication module 308 and wireless transceiver 310.

After the resolution rule is retrieved, process 500 proceeds to block 514, wherein data is stored in the buffer according to the resolution rule. In some embodiments, this can include switching from storing the first data in the buffer to storing the second data in the buffer, or continuing to store the first data in the buffer. In some embodiments, in which the user-device sources of the first and second data do not match, but the first and second data match, and in which the resolution rule indicates control of headphone 102 according to the second data, the transition from storing the first data in the buffer to storing the second data in the buffer can be seamlessly performed as outlined in blocks 524 to 532 below.

After storing data in the buffer according to the resolution rule, process 500 proceeds to block 516 wherein headphone 102, and specifically speaker 204 of headphone 102, is controlled according to the data that is stored in the buffer. In some embodiments, control circuitry 302 can receive data from the buffer and can, based on the data, generate control signals to control the operation of speaker 204.

Returning again to decision state 510, if it is determined that there is a match, then process 500 proceeds to block 518 wherein a resolution rule is retrieved. In some embodiments, the resolution rule can be same as, or different than the resolution rule identified in block 512. The resolution rule can include one or several rules for selecting one of the first and second data for control of headphone 102. In some embodiments, the resolution rule can, for example, indicate that headphone 102 is controlled according to data received via one of wired communication module 308 and wireless transceiver 310 when data is received via both of wired communication module 308 and wireless transceiver 310. In one embodiment, for example, the resolution rule can indicate that headphone 102 is controlled according to data received via wired communication module 308 when data is received via both of wired communication module 308 and wireless transceiver 310.

After the resolution rule has been received, process 500 proceeds to decision state 520, wherein it is determined if the resolution rule indicates continued control of headphone 102 with the first data. If it is determined that the resolution rule indicates continued control of headphone 102 with the first data, then process 500 proceeds to block 522, wherein first data continues to be stored in the buffer, and then continues to block 516, wherein headphones are controlled according to the data in the buffer as discussed above.

Returning again to decision state 520, if it is determined that the resolution does not indicate continued control of headphones 102 with the first data, then process 500 proceeds to block 524, wherein the first data and the second data are aligned. In some embodiments, this can include synchronizing the first and second data. After the first and second data are aligned process 500 proceeds to block 526, wherein a stopping point is identified in the first data. In some embodiments, the stopping point identifies a point in the first data after which the first data is no longer stored in the buffer. In some embodiments, the stopping point can be the earliest synchronized point in the first and second data that has not been added to the buffer or that was the last piece of data added to the buffer.

After the stopping point has been identified, process 500 proceeds to block 528, wherein the addition of first data to the buffer is stopped at the stopping point. After the addition of first data to the storage buffer has been stopped, process 500 proceeds to block 530, wherein the point in the second data corresponding to the stopping point is identified. After the point corresponding to the stopping point has been identified in the second data, process 500 proceeds to block 532, wherein second data, beginning with the point corresponding to the stopping point is stored in the buffer. In some embodiments, this can be performed so that there are no gaps in the data, missing pieces of data, or duplicate data in the buffer.

After starting storing second data in the data buffer, process 500 proceeds to block 516, wherein headphone 102 is controlled according to data stored in the buffer. In some embodiments, control of headphone 102 according to data stored in buffer results in eventual control of headphone 102 according to the second data.

In some embodiments, the steps of process 500, and specifically, steps starting at block 524 can be performed so as to allow seamless control of headphone 102. In such an embodiment, control of headphone 102 can be switched from the first data to the second data without affecting the controlling of the headphone 102 according to the data stored within the data buffer. This can allow transitioning between control according to first data to control according to second data without the operator of headphone 102 being able to notice the transition. In some embodiments, and to facilitate this transition, the buffer can be sized so that steps of process 500 including and following block 524 can be performed before the buffer has been emptied, thereby eliminating any noticeable interruption in operation of headphone 102.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A headphone comprising:
   a wireless transceiver;
   an electrical connector;
   an earpiece having a speaker, wherein the speaker is controllably connected to the electrical connector and the wireless transceiver;
   a data buffer operatively coupled to the speaker and configured to output audio data stored in the data buffer to the speaker; and
   control circuitry coupled to the data buffer, the control circuitry configured to:
   (i) transition from storing audio data received by the wireless transceiver in the data buffer to storing audio data received by the electrical connector in the data buffer in response to the control circuitry determining the audio data received by the wireless transceiver is being received from the same user device as the audio data received by the electrical connector; and
   (ii) continue to store audio data received by the wireless transceiver in the data buffer in response to the control circuitry determining the audio data being received by the wireless transceiver is being received from a different user device than the audio data being received by the electrical connector.

2. The headphone of claim 1, wherein the electrical connector comprises:
   a first contact configured to receive electrical power; and
   a second contact configured to receive the audio data associated with the second path.

3. The headphone of claim 2, further comprising:
   an energy storage device in electrical communication with the first contact and configured to be charged by way of power provided by way of the first contact.

4. The headphone of claim 1, wherein the control circuitry comprises a processor.

5. The headphone of claim 4, wherein the processor is configured to seamlessly transition speaker control between audio data received via the wireless transceiver and audio data received via the electrical connector.

6. The headphone of claim 3, wherein the data buffer is sized to operate the headphone for a predetermined amount of time without the receipt of additional data via the wireless transceiver or the electrical connector.

7. The headphone of claim 1, wherein the headphone is configured to receive digital audio data via the electrical connector.

8. The headphone of claim 3, wherein the energy storage device comprises a rechargeable battery.

9. A method of seamlessly transitioning between data sources controlling operation of a speaker in a headphone, the method comprising:
   receiving data at the headphone via a wireless data path;
   storing the data received via the wireless data path within a data buffer;
   controlling a speaker according to the data stored within the data buffer;
   receiving data at the headphone via a wired data path and the wireless data path;
   determining whether that the data received via the wireless data path and the wired data path are both being received from the same user device or two different user devices; and
   transitioning from storing data from the wireless data path within the data buffer to storing data from the wired data path within the data buffer in response to determining the data received via the wireless data path and the wired data path are received from the same user device; and
   continuing to store data received via the wireless data path in the data buffer in response to the control circuitry determining the data being received by the wireless transceiver is being received from a different user device than the data being received from the second path.

10. The method of claim 9, further comprising determining that the data received via the wired data path is the same as the data received via the wireless data path.

11. The method of claim 10, further comprising stopping the storing of data received from the wireless data path within the data buffer.

12. The method of claim 11, comprising identifying a stopping point in the data stored in the data buffer and received from the wireless data path, wherein the stopping point is the last data received from the wireless data path and stored in the data buffer.

13. The method of claim 12, comprising identifying data corresponding to the stopping point in the data received from the wired data path.

14. The method of claim 13, comprising storing data from the wired data path after the data corresponding to the stopping point in the data buffer.

15. The method of claim 9, comprising sizing the data buffer to allow transitioning from storing data from the wireless data path within the data buffer to storing data from the second data path within the data duffer without affecting the controlling of the speaker according to the data stored within the data buffer.

16. The headphone of claim 1, wherein the electrical connector is configured to receive a single plug that delivers both power and data to the headphone.

17. The headphone of claim 1, wherein the controller transitions from storing audio data from the first path to storing audio data from the second path whenever audio data is available from the second path.

18. A headphone comprising:
a wireless transceiver;
an electrical connector;
an earpiece having a speaker, wherein the speaker is controllably connected to the electrical connector and the wireless transceiver;
a data buffer operatively coupled to the speaker and configured to output audio data stored in the data buffer to the speaker; and
control circuitry coupled to the data buffer, the control circuitry configured to:
(i) transition from storing audio data received by the wireless transceiver in the data buffer to storing audio data received by the electrical connector in the data buffer in response to determining the audio data being received by the wireless transceiver is being received from the same user device as the audio data being received by the electrical connector or in response to determining the audio data being received by the wireless transceiver is the same as the audio data being received by the electrical connector; and
(ii) continue to store the audio data from the wireless transceiver when the audio data received by the wireless transceiver is received from a different user device than the audio data received by the electrical connector or when the audio data received by the wireless transceiver is different than the audio data received by the electrical connector.

19. The headphone of claim 18, wherein the electrical connector comprises:
a first contact configured to receive electrical power; and
a second contact configured to receive the audio data associated with the second path.

20. The headphone of claim 18, wherein the audio data being received from the electrical connector has a higher quality than the audio data being received from the wireless transceiver.

* * * * *